United States Patent
Mori et al.

(10) Patent No.: US 7,278,501 B2
(45) Date of Patent: Oct. 9, 2007

(54) LEGGED WALKING ROBOT AND MOTION CONTROL METHOD THEREFOR

(75) Inventors: Naoto Mori, Tokyo (JP); Jinichi Yamaguchi, c/o Tama Research Institute 5-14-38, Tamadaira, Hino-Shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

(21) Appl. No.: 10/398,070

(22) PCT Filed: Aug. 1, 2002

(86) PCT No.: PCT/JP02/07839

§ 371 (c)(1),
(2), (4) Date: Oct. 3, 2003

(87) PCT Pub. No.: WO03/011535

PCT Pub. Date: Feb. 13, 2003

(65) Prior Publication Data

US 2004/0122556 A1    Jun. 24, 2004

(30) Foreign Application Priority Data

Aug. 1, 2001    (JP) .............................. 2001-233691

(51) Int. Cl.
*G60F 19/00*    (2006.01)
(52) U.S. Cl. .............................. 180/8.5; 700/253; 901/9
(58) Field of Classification Search ................. 180/7.1, 180/8.1, 8.5, 8.6; 700/245–253; 701/23; 901/1, 9
See application file for complete search history.

(56) References Cited

U.S. PATENT DOCUMENTS

| | | | |
|---|---|---|---|
| 5,343,397 A | | 8/1994 | Yoshino et al. |
| 5,349,277 A | * | 9/1994 | Takahashi et al. ..... 318/568.12 |
| 5,355,064 A | | 10/1994 | Yoshino et al. |

(Continued)

FOREIGN PATENT DOCUMENTS

| | | |
|---|---|---|
| JP | 5-245780 | 9/1993 |
| JP | 7-205069 | 8/1995 |
| JP | 2819323 | 8/1998 |
| JP | 2819353 | 8/1998 |
| JP | 2001-138271 | 5/2001 |

OTHER PUBLICATIONS

Patent Abstracts of Japan, publication No. 03-161290 dated Jul. 11, 1991.
Patent Abstracts of Japan, publication No. 07-068480 dated Mar. 14,

*Primary Examiner*—Tony Winner
(74) *Attorney, Agent, or Firm*—Frommer Lawrence & Haug LLP; William S. Frommer; Thomas F. Presson 1995.

(57) ABSTRACT

In a robot having at least one rotating joint (which may have at least two degrees of freedom), in order to perform a high-speed switching operation between a closed link mode and an open link mode with the outside world or a working object, each limb is provided with minimum-required, passive degrees-of-freedom (such as a backlash of a reducer) for removing a dynamic closing error and also the movable range of the limb is properly controlled. Even when an actuator for driving the corresponding joint has no means for obtaining a torque signal, a high-speed switching operation between the closed link mode and the open link mode can be stably achieved.

20 Claims, 9 Drawing Sheets

U.S. PATENT DOCUMENTS

| | | | |
|---|---|---|---|
| 5,838,130 A * | 11/1998 | Ozawa | 318/568.2 |
| 6,243,623 B1 * | 6/2001 | Takenaka et al. | 700/245 |
| 6,505,096 B2 * | 1/2003 | Takenaka et al. | 700/245 |
| 6,532,400 B1 * | 3/2003 | Jacobs | 700/245 |
| 6,564,888 B1 * | 5/2003 | Gomi et al. | 180/8.6 |
| 6,636,781 B1 * | 10/2003 | Shen et al. | 700/248 |
| 6,643,563 B2 * | 11/2003 | Hosek et al. | 700/245 |
| 2004/0036437 A1 * | 2/2004 | Ito | 318/568.12 |

* cited by examiner

K: SERIES COMPENSATION GAIN (PROPORTIONAL GAIN)
C(s): TRANSFER FUNCTION OF PHASE COMPENSATOR
G(s): EXPRESSION MODEL OF TRANSFER FUNCTION BETWEEN MOTOR AND REDUCER

K: SERIES COMPENSATION GAIN (PROPORTIONAL GAIN)
C(s): TRANSFER FUNCTION OF PHASE COMPENSATOR
G(s): EXPRESSION MODEL OF TRANSFER FUNCTION BETWEEN MOTOR AND REDUCER

K: SERIES COMPENSATION GAIN (PROPORTIONAL GAIN)
C(s): TRANSFER FUNCTION OF PHASE COMPENSATOR
G(s): EXPRESSION MODEL OF TRANSFER FUNCTION BETWEEN MOTOR AND REDUCER

LEGGED WALKING ROBOT AND MOTION CONTROL METHOD THEREFOR

TECHNICAL FIELD

The present invention relates to realistic robots, each having a structure imitating a mechanism or a motion of a living body, and motion control methods therefor, and in particular to legged walking robots, each having a structure imitating a mechanism or a motion of the likes of a human and an ape who walk erect, and also the present invention relates to motion control methods therefor.

More particularly, the present invention relates to a legged walking robot, which stably and accurately performs a leg-moving operation by standing alternately with a single or both of right and left movable legs, and also the present invention relates to a motion control method therefor. Yet in particular, the present invention relates to a legged walking robot, which performs an attitude stabilization control in accordance with a detachment or a crash caused by the difference between an expected value and an actual value when the legged walking robot changes its link mechanism with a floor, a wall, or the like from an open link mechanism to a closed link mechanism, for example, when the robot switches its standing mode from a single-leg standing mode to a both-legs standing mode, and also the present invention relates to a motion control method therefor.

BACKGROUND ART

A mechanical apparatus performing a motion that imitates a human motion by using an electric or magnetic effect is called a ROBOT. The etymology of ROBOT is said to be originated in Slavic "ROBOTA (a slave machine)". Although robots have been widely used in Japan since the end of the 1960s, most robots are industrial robots such as manipulators and transport robots used for automated production and non-man production at factories.

Stationary robots such as arm robots installed fixedly at specific sites perform operations such as a parts-assembling operation and a parts-sorting operation only in a fixed and local working space. On the other hand, mobile robots perform operations in an unlimited working space such as acting for a prescribed or unprescribed human operation by moving flexibly along a predetermined route or without a route, and offer a variety of services that substitute for a human, a dog and other animate things. Among others, legged walking robots have advantages in moving up and down stairs and a ladder, walking over an obstacle, and a flexible walk and a walking motion regardless of leveled and unleveled terrain, although these robots are more unstable and more difficult in controlling an attitude and a walk than crawler-type robots and tired mobile robots.

Recently, research and development of legged walking robots such as human-shaped robots, i.e., humanoid robots designed by modeling after a body mechanism and a motion of biped walking animals such as a human have advanced, and thus expectations for practical use have been increasingly built up. For example, a biped-walking, humanoid robot "SDR-3X" was disclosed by Sony Corporation on Nov. 25, 2000.

The following two are exemplary viewpoints from which the importance of research and development of a biped walking robot called a human-shaped robot, i.e., a humanoid robot is understood.

One is a viewpoint from human science. More particularly, fabricating a robot having a structure imitating human lower limbs and/or upper limbs and devising the control method therefor lead to technologically solving a mechanism of natural human motions including walking through a simulation process of the human motions. Such study is expected to significantly contribute to promoting a variety of other research fields for human athletic mechanisms such as ergonomics, rehabilitation technology, and sports science.

The other is a viewpoint from the development of practical robots for supporting living activities as a partner of man, that is, for supporting human activities in various daily environments including a living environment. Such kinds of robots are required to learn the way of adapting to people, each having different personalities, or to different environments while being taught by the people, and to further develop the functions thereof in various aspects of human living environments. A human-shaped robot or a robot having the same shape or the same structure with man is expected to function effectively for smooth communication with man.

For example, when teaching a robot the way of passing through a room on site while avoiding an obstacle on which the robot must not step, an operator expects to more easily teach the above-mentioned way to a biped walking robot having a similar shape with that of the operator than to a crawler-type robot or a quadruped robot having a structure totally different from that of the operator. Also, it must be the easy way for the robot to be taught (for example, refer to Takanishi: Control of Biped walking robot, Society of Automotive Engineers of Japan, Kanto Charter, <KOSO> No. 25, Apr. 1996).

Most of a human working and living spaces are formed in accordance with a body mechanism and patterns of behavior of a human who walks erect with two legs. In other words, so many obstacles exist against a current mechanical system having wheels and a driving unit as moving means to move in the human living space. In order for the mechanical system, i.e., the robot, to offer services that support or substitute a variety of human operations and to be thus deeply involved in the human living space, it is preferable that the robot have a movable range substantially the same as that of a human. This is the reason why the legged walking robot is greatly expected to come into practical use. It can be said that the robot must have a human structure so as to improve affinity to the human living environment.

A large number of attitude controls and stable walk technologies about biped walking robots have been proposed. The stable walk as mentioned above is defined as a legged locomotion without falling down.

An attitude stabilization control of a robot is extremely important for preventing the robot from falling down, because falling-down leads to suspending the performing operation of the robot and also requires a considerable amount of energy and time for standing up and restarting the operation from falling down. Most importantly, falling-down of the robot causes a risk of a fatal damage to the robot itself or to an opposing obstacle colliding with the falling robot. Accordingly, the attitude stabilization control for walking and other leg-moving operations is the most important technical matter in designing and developing a legged walking robot.

While walking, a gravitational force, an inertia force, and a moment due to these forces from a walking system act on a road surface because of a gravity and an acceleration caused by a walking motion. According to a so-called D'Alambert principle, these forces and the moment balance a floor reaction force and moment as a reaction from the road surface to a walking system. As a result of the dynamic deduction, a supporting polygon formed by the grounding points of foot bottoms and the road surface has a point at which pitch-axis and roll-axis moments are zero, in other words, a zero moment point (ZMP) on the sides of or inside the supporting polygon.

Most proposals about the attitude stabilization controls and falling prevention of legged walking robots use this ZMP as a criterion for determining walking stability. Generation of a biped walking pattern based on the ZMP criterion has advantages in easily considering a toe condition of kinematical constraints in accordance with a road surface profile and the like since the grounding point of the foot bottom can be preset. Using ZMP as a criterion for determining stability means that a trajectory instead of a force is used as a target value for a motion control, thereby increasing the technical feasibility of the robot.

A general idea of ZMP and an application of ZMP to a criterion for determining stability of a walking robot are described in "LEGGED LOCOMOTION ROBOTS" written by Miomir Vukobratovic ("Walking Robot and Artificial Leg" written by Ichiro Kato, et al., The Nikkan Kogyo Shimbun Ltd.).

In general, a biped walking robot such as a humanoid robot has a center of gravity at a higher position and a narrower ZMP region for stable walking than a quadruped walking robot. Therefore, such an issue of an attitude variation depending on a road surface profile is especially important to the biped walking robot.

However, the legged walking robot has just taken a first step from a development stage to a practical application stage and a large number of technological problems still remain unsolved.

The legged walking robot expected to take an active role in the human living environment basically has a plurality of "limbs" formed of rotating joints and is required to perform a high-speed switching operation between a closed link mode and an open link mode with the outside world or a working object so as to achieve stable biped walking, a stable two-arms operation, or the like.

For example, the legged walking robot performs a variety of leg-moving operations such as walking by usually standing alternately with a single or both of right and left movable legs. When the legged walking robot changes its link mechanism with a floor, a wall, or the like from an open link mechanism to a closed link mechanism, for example, when it switches its standing mode from a single-leg standing mode to a both-legs standing mode, it often has a difference between an expected value from its control system and an actual value, for example, at its grounding toe.

Such a difference between the expected value and the actual value causes "detachment" which means that the toe has not yet grounded at the time when it is expected to ground or "crash" which means that the toe has grounded earlier than expected. These detachment and crash have a great effect on an attitude stabilization control of the body of the legged walking robot.

Heretofore, there have been attempts for achieving a high-speed switching operation from the open link mode to the closed link mode with a feedback control by using software on the basis of a force signal from a force sensor disposed at the top of a limb or a torque signal from an actuator for driving a joint. However, achieving a stable motion with this method is very difficult from a technical viewpoint since a short feedback cycle, a high resolution, a high speed, and a large acceleration for driving the joint are required to an unrealistic degree.

DISCLOSURE OF INVENTION

An object of the present invention is to provide an excellent legged walking robot which stably and accurately performs a leg-moving operation by switching its standing modes, for example, by standing alternately with a single or both of right and left movable legs, and also to provide an excellent motion control method therefor.

Another object of the present invention is to provide an excellent legged walking robot which performs an attitude stabilization control in accordance with a detachment or a crash caused by the difference between an expected value and an actual value when the legged walking robot changes its link mechanism with a floor, a wall, or the like from an open link mechanism to a closed link mechanism, for example, when it switches its standing mode from a single-leg standing mode to a both-legs standing mode, and also to provide an excellent motion control method therefor.

Another object of the present invention is to provide an excellent legged walking robot which performs a high-speed switching operation between an open link mode and a closed link mode with the outside world or a working object without losing the attitude stability of its body, and also to provide an excellent motion control method therefor.

The present invention is made taking the above-mentioned problems into account, and, in accordance with a first aspect thereof, a legged walking robot comprises at least movable legs, wherein each movable leg has a plurality of joint degrees-of-freedom and passive degrees-of-freedom with an order of priority are provided to corresponding joints so as to remove a dynamic closing error.

According to the legged walking robot in accordance with the first aspect of the present invention, in the robot having at least one rotating joint (which may have at least two degrees of freedom), in order to perform a high-speed switching operation between a closed link mode and an open link mode with the outside world or a working object, each limb is provided with minimum-required, passive degrees-of-freedom (such as a backlash of a reducer) for removing a dynamic closing error and also the movable range of the limb is properly controlled.

Accordingly, even when an actuator for driving the corresponding joint has no means for obtaining a torque signal, a high-speed switching operation between the closed link mode and the open link mode can be stably achieved.

When the legged walking robot is, for example, a biped walking robot having right and left movable legs, the right and left movable legs may be formed so as to have substantially the same degrees-of-freedom with each other. As a result, the body has a substantially symmetrical characteristic, thereby making the attitude stabilization control easy.

Also, each joint degree-of-freedom of the movable leg is achieved by an actuator to which a reducer is connected. In this case, the passive degree-of-freedom of each joint is realized by a backlash of the reducer connected to the actuator.

Also, by arranging a joint of one limb lying closer to the far end of the limb so as to have a larger backlash than that of another joint of the limb, a disturbance caused by fluctuations of corresponding links at the time of the grounding of the corresponding idle leg can be reduced and also occurrence of a large torque caused by a high-gain, local feedback control system can be prevented, thereby preventing sudden slippage or detachment of a corresponding foot bottom.

The movable leg has at least joint degrees-of-freedom about corresponding hip-joint roll-axis, ankle-joint roll-axis, hip-joint pitch-axis, knee-joint pitch-axis, ankle-joint pitch-axis, and hip-joint yaw-axis. In this case, by arranging that backlashes about the corresponding hip-joint roll-axis, ankle-joint roll-axis, hip-joint pitch-axis, knee-joint pitch-axis, and ankle-joint pitch-axis become smaller in that order, a disturbance caused by the fluctuations of the corresponding links at the time of the grounding of the corresponding idle leg can be reduced and also occurrence of a large torque caused by the high-gain, local feedback control system can be prevented, thereby preventing sudden slippage or detachment of the corresponding foot bottom.

Also, by controlling fluctuations of corresponding links, which occur when the dynamic closing error generated at the time of the grounding of the corresponding idle leg is removed, in the following order: a foot>a lower thigh>an upper thigh, a disturbance caused by the fluctuations of the corresponding links at the time of the grounding of the corresponding idle leg can be reduced and also occurrence of a large torque caused by the high-gain, local feedback control system can be prevented, thereby preventing the corresponding foot bottom from suddenly slipping on or being detached from a floor surface.

Also, in order to maintain a ZMP-attitude stabilization control of the body, the sum of backlashes of the whole limb in each degree-of-freedom may be controlled. For example, it is preferable than one lower limb have the sum of backlashes about the roll axis in the range from 0.05 to 2.0 deg. Also, it is preferable that one lower limb have the sum of backlashes about the pitch axis in the range from 0.10 to 4.0 deg.

In accordance with a second aspect of the present invention, a robot apparatus comprises at least one joint having degrees of freedom about at least roll and pitch axes, wherein the joint has a roll-axis backlash $\Delta R$ and a pitch-axis backlash $\Delta P$, and these backlashes satisfy the following condition:

$$\Delta P > \Delta R$$

In this case, the pitch-axis backlash $\Delta P$ may be at least 1.5 times the roll-axis backlash $\Delta R$.

The legged walking robot has joint degrees-of-freedom of each joint of the trunk, the hip joints, the ankles, and so forth by combining the roll and pitch axes. The inventors et al. recommend that the body be designed such that a backlash $\Delta P$ about the pitch axis is greater than a backlash $\Delta R$ about the roll axis (i.e., $\Delta P > \Delta R$) for their common joint. When walking straight ahead is considered, the biped, legged walking robot has rolling and yawing motions which are dominant because of having no yawing motion involved, and thus the robot has a wider stable region in the X-direction than in the Y-direction, thereby leading to the conclusion: $\Delta P > \Delta R$.

Also, when the yaw axis is disposed at the base of the leg as the joint degrees-of-freedom structure of the body, even when a yawing motion occurs, for example, at the time of turning, the motion does not interfere with the pitching or rolling motion of the flat foot in a leg coordinate system (in which the hip joint axis is an origin). That is, the attitude deviation of the flat foot caused by a backlash $\Delta Y$ of the yaw axis affects only on a yaw-axis angle and can be ignored when a virtually stable region is large enough compared to the deviation.

On the other hand, when the yaw axis is disposed at the upper thigh or the lower thigh, the backlash $\Delta Y$ of the yaw axis interferes with the pitching or rolling motion of the flat foot in the leg coordinate system (in which the hip joint axis is an origin). In this case, it is increasingly important to control the backlash $\Delta Y$ of the yaw axis.

In accordance with a third aspect of the present invention, a motion control method for a legged walking robot including at least movable legs, each having a plurality of joint degrees-of-freedom established by position servo control, comprises the step of providing passive degrees-of-freedom to corresponding joints for removing a dynamic closing error of the corresponding joint.

According to the motion control method for a legged walking robot in accordance with the third aspect of the present invention, in the robot having at least one rotating joint (which may have at least two degrees of freedom), in order to perform a high-speed switching operation between a closed link mode and an open link mode with the outside world or a working object, each limb is provided with minimum-required, passive degrees-of-freedom (such as a backlash of a reducer) for removing a dynamic closing error and also the movable range of the limb is properly controlled.

In the step for providing the passive degrees-of-freedom, the dynamic closing error can be removed by adjusting proportional gains of the corresponding joints.

Also, when the legged walking robot is a biped walking robot having light and left movable legs, in the step for providing the passive degrees-of-freedom, proportional gains of the corresponding joints are adjusted such that the right and left movable legs have substantially the same passive degrees-of-freedom with each other. As a result, the body has a substantially symmetrical characteristic, thereby making the attitude stabilization control easy.

Also, in the step for providing the passive degrees-of-freedom, it is preferable that the proportional gains of the corresponding joints be adjusted such that a joint of one limb lying closer to the far end of the limb has a greater passive degree-of-freedom.

For example, when the movable leg has at least joint degrees-of freedom about the corresponding hip-joint roll-axis, ankle-joint roll-axis, hip-joint pitch-axis, knee-joint pitch-axis, ankle-joint pitch-axis, and hip-joint yaw-axis, in the step for providing the passive degrees-of-freedom, it is preferable that proportional gains of the corresponding joints be adjusted such that a movable range of the hip-joint roll-axis is smaller than that of the ankle-joint roll-axis. As a result, a disturbance caused by the fluctuations of the corresponding links at the time of the grounding of the corresponding idle leg can be reduced and also occurrence of a large torque caused by the high-gain, local feedback control system can be prevented, thereby preventing sudden slippage or detachment of the corresponding foot bottom.

Also, in the step for providing the passive degrees-of-freedom, proportional gains of the corresponding joints may be adjusted such that fluctuations of corresponding links, which occur when the dynamic closing error generated at the time of the grounding of the corresponding idle leg is removed, are controlled in the following order: a foot>a lower thigh>an upper thigh. As a result, a disturbance caused by the fluctuations of the corresponding links at the time of the grounding of the corresponding idle leg can be reduced and also occurrence of a large torque caused by the high-gain, local feedback control system can be prevented, thereby preventing sudden slippage or detachment of the corresponding foot bottom.

Also, in order to maintain the ZMP-attitude stabilization control of the body, in the step for providing the passive degrees-of-freedom, the sum of the passive degrees-of-freedom of the whole limb in the each degree-of-freedom may be controlled.

Other objects, features, and advantages of the present invention will be apparent from the detail description, which will be described later, based on an embodiment of the present invention and the accompanying drawings.

BRIEF DESCRIPTION OF THE DRAWINGS

FIG. 3 is a schematic illustration of a degrees-of-freedom configuration model which the legged walking robot 100 according to the embodiment is provided with.

BEST MODE FOR CARRYING OUT THE INVENTION

An embodiment of the present invention will be described in detail with reference to the accompanying drawings.

Figure 1:
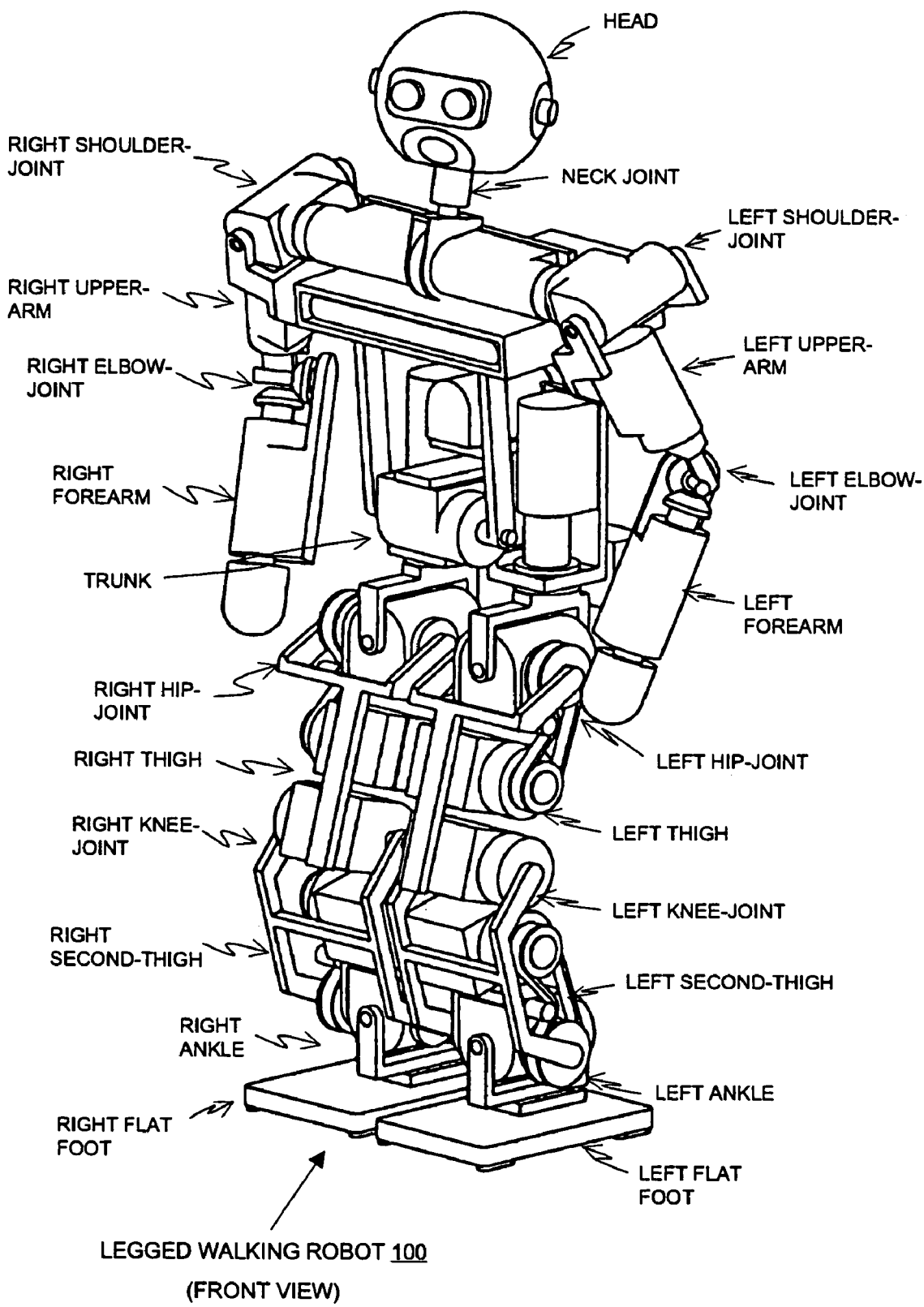
FIG. 1 is a perspective front view of a legged walking robot 100 according to an embodiment of the present invention.
Figure 2:
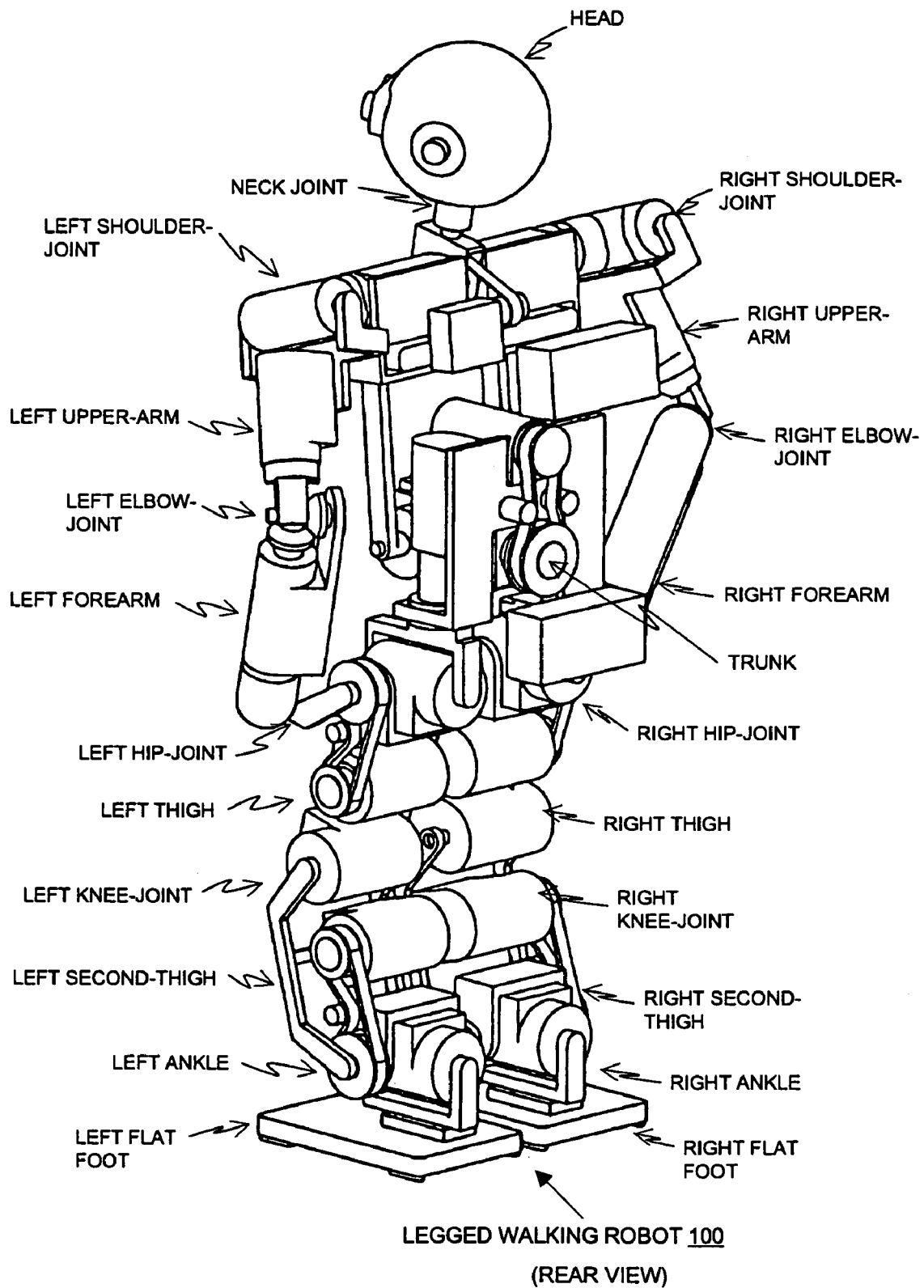
FIG. 2 is a perspective rear view of the legged walking robot 100 according to the embodiment of the present invention.

FIGS. 1 and 2 are respectively perspective front and rear views of a legged walking robot 100 according to an embodiment of the present invention. Also, FIG. 3 schematically illustrates the joint degrees-of-freedom structure which the legged walking robot 100 is provided with.

Figure 3:
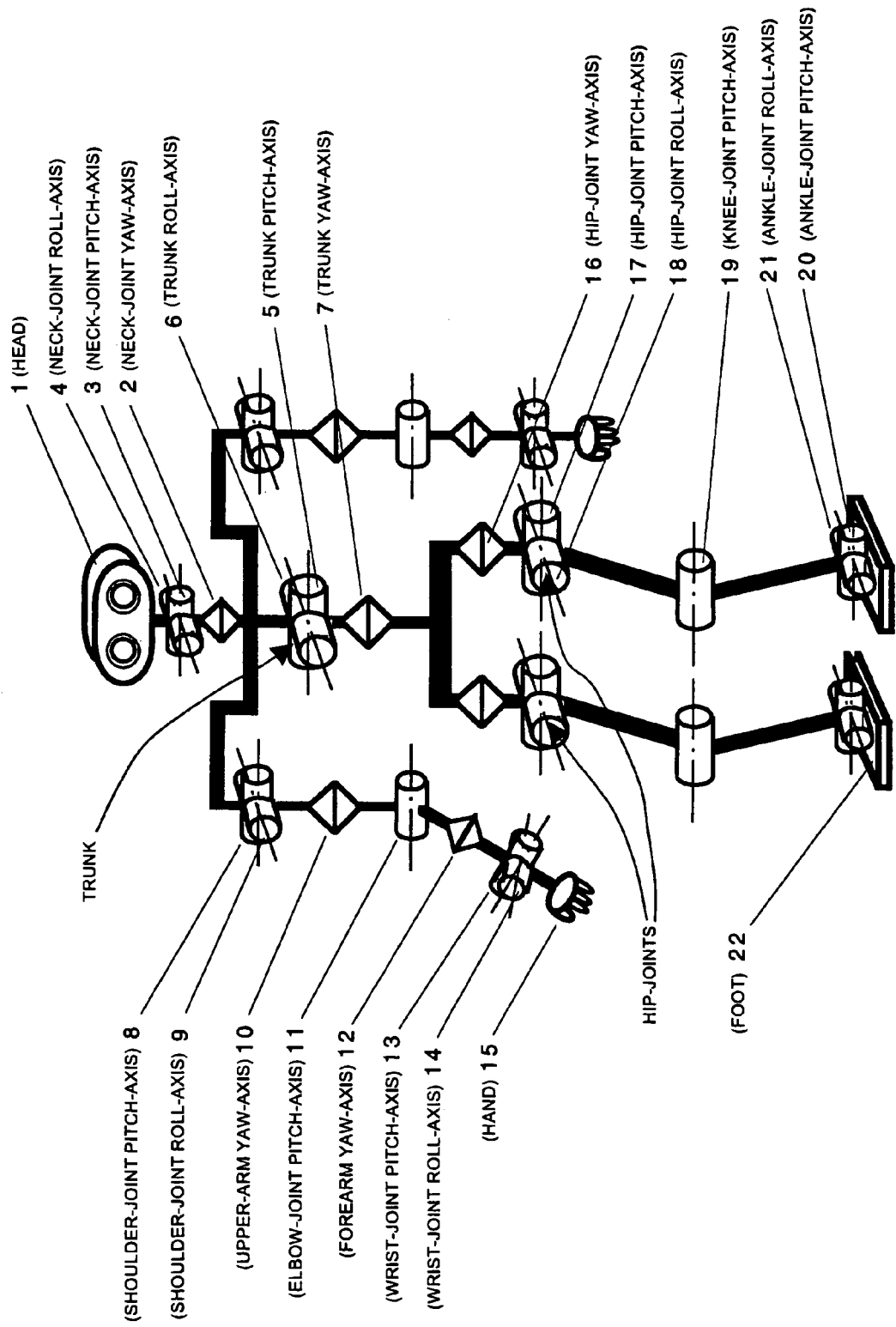

As shown in FIG. 3, the legged walking robot 100 has a structure of a plurality of limbs formed of upper limbs including two arms and a head 1, lower limbs including two legs for achieving a locomotive motion, and a trunk connecting the upper limbs and the lower limbs.

A neck joint for supporting the head 1 has 3 degrees of freedom: i.e., a neck-joint yaw-axis 2, a neck-joint pitch-axis 3, and a neck-joint roll-axis 4.

Each arm has a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. In reality, the hand 15 has a multi-joints, multi-degrees-of-freedom structure including a plurality of fingers. However, it is assumed in this specification that the hand 15 has zero degree of freedom since motions of the hands 15 have little affect on the attitude control and the walking control of the legged walking robot 100. That is to say, each arm has 7 degrees of freedom.

The trunk has 3 degrees of freedom: i.e., a trunk pitch-axis 5, a trunk roll-axis 6, and a trunk yaw-axis 7.

Each leg forming the lower limbs has a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In this specification, the cross point between the hip-joint pitch-axis 17 and the hip-joint roll-axis 18 defines a hip-joint location of the legged walking robot 100 according to this embodiment. Although a human foot 22 actually has a structure including a foot bottom having multi-joints multi-degrees-of-freedom, it is assumed that the foot bottom of the legged walking robot 100 according to this embodiment has zero degree of freedom. That is to say, each leg has 6 degrees of freedom.

Thus, in summary, the legged walking robot 100 according to this embodiment has 32 (=3+7×2+3+6×2) degrees of freedom in total. However, the legged walking robot 100 applied for entertainment is not always limited to having 32 degrees of freedom. One skilled in the art will appreciate that the number of degrees of freedom or the number of joints can be changed properly in accordance with limitations on design and fabrication, requirement specifications, or the like.

Each degree-of-freedom of the foregoing legged walking robot 100 is actually implemented by using an actuator. The preferable actuator is small and light in consideration of the requirements for assimilating it to the outer shape of a natural human body by eliminating an excessive projection thereof and for performing the attitude control of the unstable biped walking structure thereof. In this embodiment, a small AC servo actuator that is directly coupled to a gear and that houses a one-chip servo-system is mounted. Such an AC servo actuator is disclosed, for example, in Japanese Unexamined Patent Application Publication No. 2000-299970 (Japanese Patent Application H11-33386) which has already been assigned to the same assignee.

Figure 4:
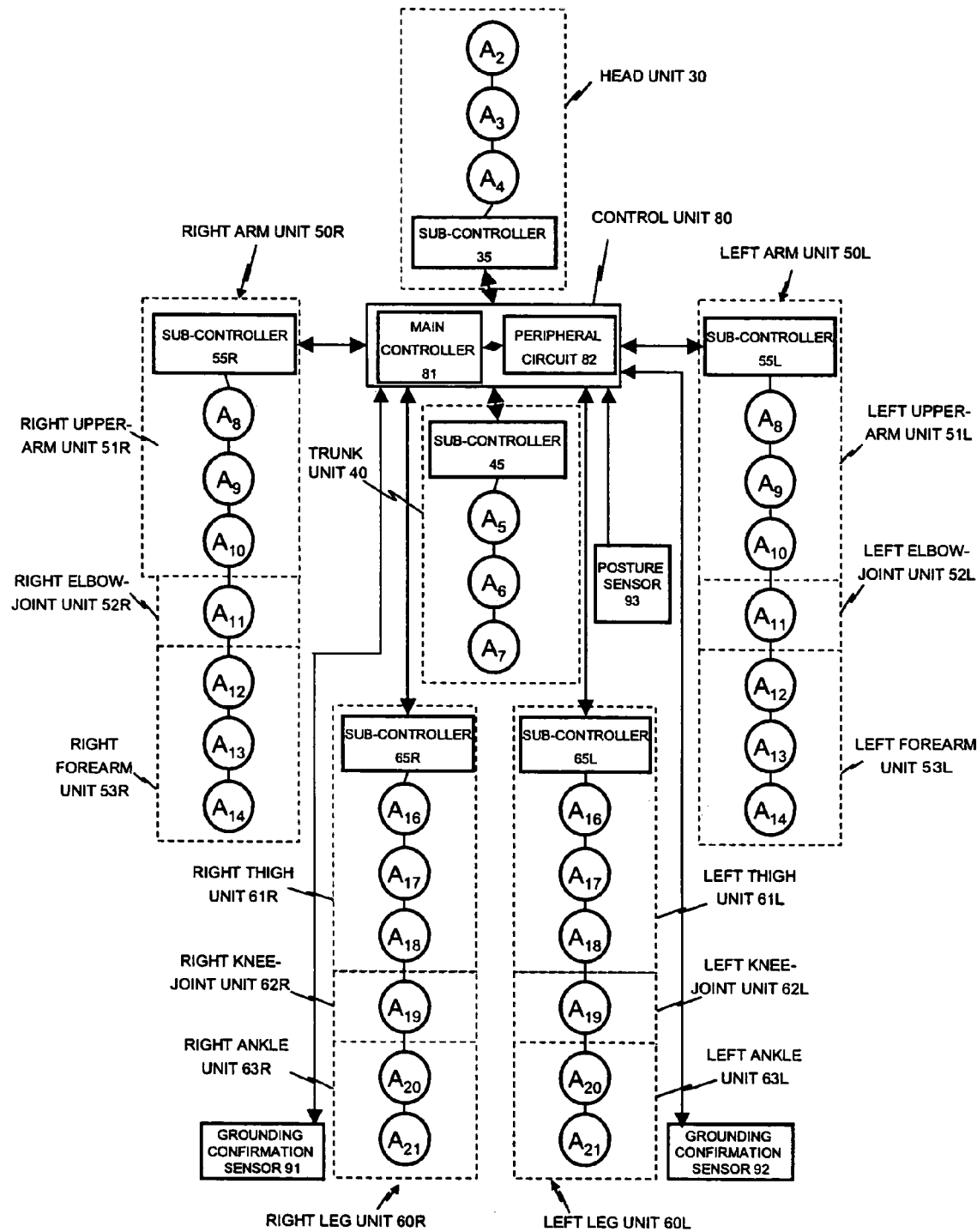
FIG. 4 is a schematic illustration of a control-system configuration model of the legged walking robot 100 according to the embodiment.

FIG. 4 schematically illustrates the control system configuration of the legged walking robot 100. As shown in the figure, the legged walking robot 100 has mechanism units 30, 40, 5OR/L, and 60R/L, each representing the corresponding one of four human limbs, and a control unit 80 performing an adaptive behavior control for achieving a coordinated motion among the mechanisms (hereinafter, postfixes R and L represent right and left, respectively).

The control unit 80 performs a centralized control over the overall motion of the legged walking robot 100. The control unit 80 has a main control unit 81 including main circuit components (not shown) such as a CPU (central processing unit) and a memory, and a periphery circuit 82 including an interface (not shown) for sending and receiving data and commands to and from a power supply circuit (not shown) and each component of the legged walking robot 100.

There is no limitation to an installation location of the control unit 80 in the way of achieving the present invention. Although mounted on the trunk unit 40 in FIG. 4, the control unit 80 may be mounted on the head unit 30. Alternatively, the control unit 80 may be installed out of the legged walking robot 100 and may communicate with the body of the legged walking robot 100 by a wire or wireless method.

Each joint degree-of-freedom of the legged walking robot 100 shown in FIG. 3 is achieved by the corresponding actuator. In other words, the head unit 30 has a neck-joint yaw-axis actuator $A_2$, a neck-joint pitch-axis actuator $A_3$, and a neck-joint roll-axis actuator $A_4$ disposed therein for representing the neck-joint yaw-axis 2, the neck-joint pitch-axis 3, and the neck-joint roll-axis 4, respectively.

The trunk unit 40 has a trunk pitch-axis actuator $A_5$, a trunk roll-axis actuator $A_6$, and a trunk yaw-axis actuator $A_7$ disposed therein for representing the trunk pitch-axis 5, the trunk roll-axis 6, and the trunk yaw-axis 7, respectively.

The arm units 50R/L are broken down into upper-arm units 51R/L, elbow-joint units 52R/L, and forearm units 53R/L. Each of the arm units. 50R/L has a shoulder-joint pitch-axis actuator $A_8$, a shoulder-joint roll-axis actuator $A_9$, an upper-arm yaw-axis actuator $A_{10}$, an elbow-joint pitch-axis actuator $A_{11}$, an elbow-joint roll-axis actuator $A_{12}$, a wrist-joint pitch-axis actuator $A_{13}$, and a wrist-joint roll-axis actuator $A_{14}$ disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively.

The leg units 60R/L are broken down into thigh units 61R/L, knee units 62R/L, and second-thigh units 63R/L. Each of the leg units 60 R/L has a hip-joint yaw-axis actuator $A_{16}$, a hip-joint pitch-axis actuator $A_{17}$, a hip-joint roll-axis actuator $A_{18}$, a knee-joint pitch-axis actuator $A_{19}$, an ankle-joint pitch-axis actuator $A_{20}$, and an ankle-joint roll-axis actuator $A_{21}$ disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively.

Each of the actuators $A_2, A_3$ . . . used for the corresponding joint is preferably configured by the foregoing small AC servo actuator that is directly coupled to a gear and that houses a one-chip servo-system.

The head unit 30, the trunk unit 40, the arm units 50, and the leg units 60 have sub-controllers 35, 45, 55, and 65 for driving the corresponding actuators disposed therein. The trunk unit 40 has grounding detection sensors 91 and 92 for detecting the grounding of the foot bottoms of the legs 60R and 60L mounted thereon, respectively, and also is provided with an attitude sensor 93 for measuring the attitude thereof.

Each of the grounding detection sensors 91 and 92 is formed of a proximity sensor, a micro-switch, or the like placed on the foot bottom. The attitude sensor 93 is formed of a combination of an acceleration sensor and a gyro-sensor, for example.

Outputs of the grounding detection sensors 91 and 92 are used to determine whether each of the right and left legs is in a standing state or in an idle state during a motion such as walking or running. An output of the attitude sensor 93 is used to detect an inclination and an attitude of the trunk.

The main controller 80 dynamically modifies a control target in response to the outputs of the sensors 91 to 93. More particularly, the main controller 80 adaptively controls each of the sub-controllers 35, 45, 55, 65, thereby achieving a whole-body motion pattern driven in concert by the upper limbs, the trunk, and the lower limbs of the legged walking robot 100.

When the main controller 81 sets foot motions, a zero moment point (ZMP) trajectory, a trunk motion, upper limb motions, a waist height, and so forth and transmits a command instructing a motion responsive to the above-mentioned setting to each of the sub-controllers 35, 45, 55, and 65, the whole-body motion of the robot 100 is achieved. Here, "ZMP" means a point at which a moment caused by floor reaction forces during walking is zero, and "ZMP trajectory" means a trajectory of the moving ZMP, for example, while the legged walking robot 100 is walking as described above. The sub-controllers 35, 45, 55, and 65 interpret the corresponding commands received from the main controller 81 and output drive control signals to the corresponding actuators $A_2, A_3$ . . . . Also, the main controller 81 outputs control signals for adjusting proportional gains K of the corresponding actuators $A_2, A_3$ . . . implementing the corresponding joint degrees-of-freedom. When the corresponding sub-controllers 35, 45, 55, and 65 adjust the proportional gains of the corresponding actuators $A_2, A_3$ . . . , passive degrees-of-freedom corresponding to respective backlashes can be changed (as will be described later).

The legged walking robot 100 according to this embodiment basically has a structure of a plurality of "limbs" formed of rotating joints and its body performs a high-speed switching operation between a closed link mode and an open link mode with the outside world or a working object so as to achieve stable biped walking, a stable two-arms operation, or the like. During a switching operation between the closed link mode and the open link mode, the difference between an expected value and an actual value causes a problem, such as "detachment", "crash", or the like, with the outside world, or a working object.

For example, such a difference causes "detachment" which means that a toe has not yet grounded at the time when it is expected to ground or "crash" which means that the toe has grounded earlier than expected. These detachment and crash have a great effect on an attitude stabilization control of the body of the legged walking robot.

In view of the above-mentioned background, the legged walking robot 100 according to this embodiment is arranged such that each limb has minimum-required passive degrees-of-freedom for removing a dynamic closing error and also the movable range of the limb is properly controlled. As a result, even when an actuator for driving the corresponding joint has no means for obtaining a torque signal, a high-speed switching operation between the closed link mode and the open link mode can be stably achieved.

In order to achieve the biped walking robot 100 according to this embodiment, each leg has the following 6 joint degrees-of-freedom (refer to FIG. 3).

hip-joint yaw-axis (TH_Y)
hip-joint roll-axis (TH_R)
hip-joint pitch-axis (TH_P)
knee-joint pitch-axis (KN_P)
ankle-joint pitch-axis (AK_P)
ankle-joint roll-axis (AK_R)

Each leg has the hip-joint yaw-axis (TH_Y) disposed at the hip of the body and the ankle-joints at the corresponding flat foot. In this embodiment, in order to make the attitude stabilization control of the biped, legged walking robot 100 easy, outputs of the actuators implementing the foregoing 6 joint degrees-of-freedom and backlashes of the corresponding joints are optimized.

For optimization, an order of priority is laid down for the backlashes of these six joints. More particularly, these backlashes are placed in ascending order (that is, from better to worse) as described below.
1. a backlash about the hip-joint roll-axis: $\Delta TH\_R$
2. a backlash about the ankle-joint roll-axis: $\Delta AK\_R$
3. a backlash about the hip-joint pitch-axis: $\Delta TH\_P$
4. a backlash about the knee-joint pitch-axis: $\Delta KN\_P$
5. a backlash about the ankle-joint pitch-axis: $\Delta AK\_P$
6. a backlash about the hip-joint yaw-axis: $\Delta TH\_Y$ Condition 1

$$\Delta TH\_R < \Delta AK\_R < \Delta TH\_P < \Delta KN\_P < \Delta AK\_P < \Delta TH\_Y$$

When the legged walking robot 100 is bilaterally symmetrical as shown in FIGS. 1 to 3, it should be understood that the order of priority for the foregoing joints is likewise applied to both of the right and left legs. Also, it is preferable that the corresponding joints of the right and left legs have the same backlash as each other from the view point of making the attitude stabilization control easy.

When the left and right legs are denoted by L and R, respectively, the bilaterally symmetrical legs are defined by the following relational expressions.

Condition 2

$$\Delta LTH\_R = \Delta RTH\_R$$

$$\Delta LAK\_R = \Delta RAK\_R$$

$$\Delta LTH\_P = \Delta RTH\_P$$

$$\Delta LKN\_P = \Delta RKN\_P$$

$$\Delta LAK\_P = \Delta RAK\_P$$

$$\Delta LTH\_Y = \Delta RTH\_R$$

When the above condition is satisfied due to the body design or another constraint, the sum of the backlashes in each degree-of-freedom of one limb is controlled. More particularly, by setting the following expression so as to be satisfied, substantially the same advantageous effect can be achieved.

Condition 3

$$\Delta LTH\_R + \Delta LAK\_R = \Delta RTH\_R + \Delta RAK\_R < \gamma$$

$$\Delta TH\_R + \Delta LKN\_P + \Delta LAK\_P = \Delta RTH\_R + \Delta RKN\_P + \Delta RAK\_P < \delta$$

$$\Delta LTH\_Y = \Delta RTH\_Y$$

In summary, in this embodiment, by setting the distribution of the backlashes of the corresponding joints so as to satisfy one of Conditions 1 to 3, the body design of the legged walking robot 100 can be optimized.

By optimizing the distribution of the backlashes of the corresponding joints of the leg as described above, the attitude stabilization control of the biped, legged walking robot 100 can be made easy.

With a first method for optimizing the body design of the legged walking robot 100 so as to satisfy one of Conditions 1 to 3, a backlash of a reducer fixed to an actuator forming each joint is measured and screened, and the actuator with the reducer having the screened backlash is disposed to the corresponding joint so as to form the body.

With a second method for optimizing the body design of the legged walking robot 100, a gain of a servo controller of an actuator with a reducer having a uniform backlash is adjusted so as to satisfy one of Conditions 1 to 3.

Figure 5:
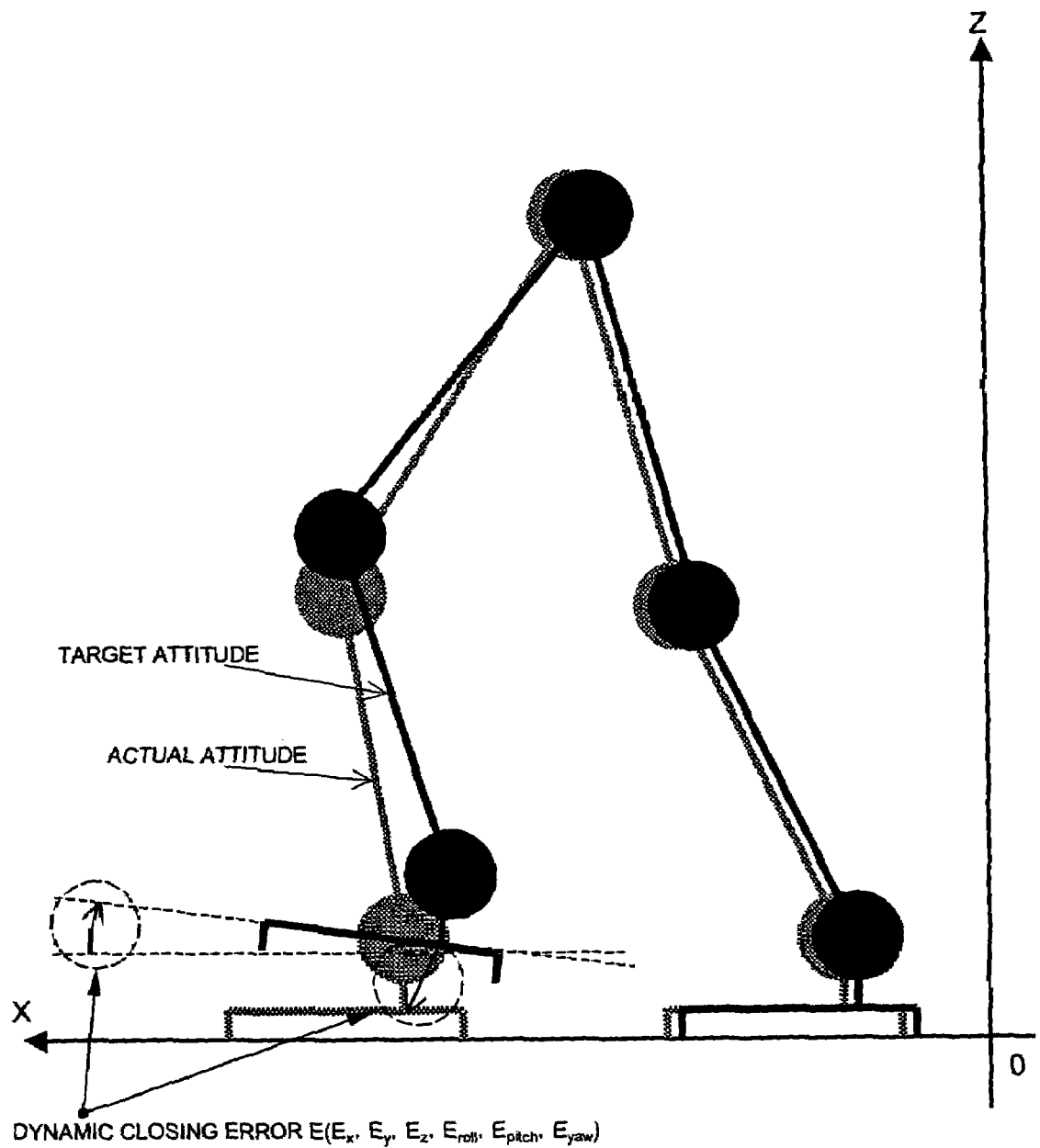
FIG. 5 illustrates a dynamic closing error of the biped, legged walking robot during its leg-motion.

With the first method for optimizing the legged walking robot 100, each limb has minimum-required, passive degrees-of-freedom for removing a dynamic closing error, and also the movable range of each passive degree-of-freedom is properly controlled. As shown in FIG. 5, a term "closing point" here is a contact point of an idling leg, with which two leg links form a geometrically closed state with a floor surface when the idling leg grounds. Also, the term "dynamic closing error" is formed of a distance error and an angle error, between a target attitude and an actual attitude, of a closing member with respect to the closing point (closing surface), that is, a spatially displaced amount of the closing surface. In addition, the passive degree-of-freedom is mainly achieved by using a backlash of the reducer. In other words, by properly controlling the backlash of the reducer connected to the actuator for driving the corresponding joint of the leg, even when the actuator for driving the joint has no means for obtaining a torque signal, a high-speed switching operation between the open link mode and the closed link mode can be stably achieved.

According to the first method, since characteristics of the legs can be defined by physical backlashes, the characteristics of the legs suitable for feed-forward walking can be always obtained.

According to the basic principle of the first method for optimizing the legged walking robot 100, as one joint of a lime lies closer to the far end of the limb, the joint has a greater backlash and the sum of the backlashes in each degree-of-freedom of the limb is controlled.

With this arrangement, fluctuations of the corresponding links caused by removing the dynamic closing error generated, for example, at the time of the grounding of the corresponding idle leg are controlled in the following order: a foot>a lower thigh>an upper thigh. As a result, a disturbance caused by the fluctuations of the corresponding links at the time of the grounding of the corresponding idle leg can be reduced and also occurrence of a large torque caused by a high-gain, local feedback control system can be prevented, thereby preventing sudden slippage or detachment of the corresponding foot bottom.

Assuming that the sum of the backlashes is the same as that of the present invention, the case in which the backlashes are distributed in the following order; a hip joint>a knee joint>an ankle joint, that is, the reverse order of that of the present invention, will be discussed.

In this case, since the hip joint has a large backlash, the deviations of the foot bottom of the idle leg with respect to its "position and attitude" become larger, thereby resulting in deteriorated accuracy of a ZMP control at the time of switching the standing mode. In addition, since the backlash of the top of the limb at the time of the grounding of the corresponding idle leg is small, fluctuations of the corresponding links are approximately expressed by "upper thigh=lower thigh=foot". As a result, a disturbance caused by the fluctuations of the corresponding links at the time of the grounding of the corresponding idle leg increases, and large torques caused by the high-gain, local feedback system are more likely to suddenly occur at foot and knee actuators, whereby the corresponding foot bottom may be more likely to be suddenly detached (eventually, the body may be fallen down).

FIG. 5 illustrates a dynamic closing error during a leg-motion of the biped, legged walking robot 100. The dynamic closing error is a deviation of the actual attitude of the body from its target attitude and is represented by errors of a distance and an angle which vary as time goes on. The dynamic closing error itself can be eliminated.

The first method for optimizing the legged walking robot 100, in which, as one joint of a lime lies closer to the far end of the limb, the joint has a greater backlash and the sum of the backlashes in each degree-of-freedom of the limb is controlled, is not limited to the lower limbs as described above; but it is also applicable to the hands and the upper limbs in the same manner.

In the case of the hands and the upper limbs, while controlling the sum of backlashes in each degree-of-freedom of one limb, as one joint of a limb lies closer to the far end of the limb, the joint has a greater backlash. When, as opposed to the above case, one joint of a limb has a greater backlash as the joint lies closer to the base of the limb, a fluctuation of the whole limb generated during a transitional period from the open link mode to the closed link mode increases, thereby resulting in deteriorated accuracy of a handling activation control and the ZMP control.

Target values of the total backlashes about the roll and pitch axes of each limb are shown below:

0.15 deg.<the total backlash ($\gamma$) about the roll axis<0.40 deg.

0.30 deg.<the total backlash ($\delta$) about the roll axis<0.80 deg.

The first method for optimizing the legged walking robot 100 has an aspect of utilizing variations in backlashes of the reducers connected to the corresponding joint actuators. Therefore, when joint actuators for legged walking robots are commercially produced and thus the production of reducers having backlashes varying in a certain variation range is realized, it is hard to say that the foregoing first method in which the backlashes are measured and screened is the best.

Figure 6:
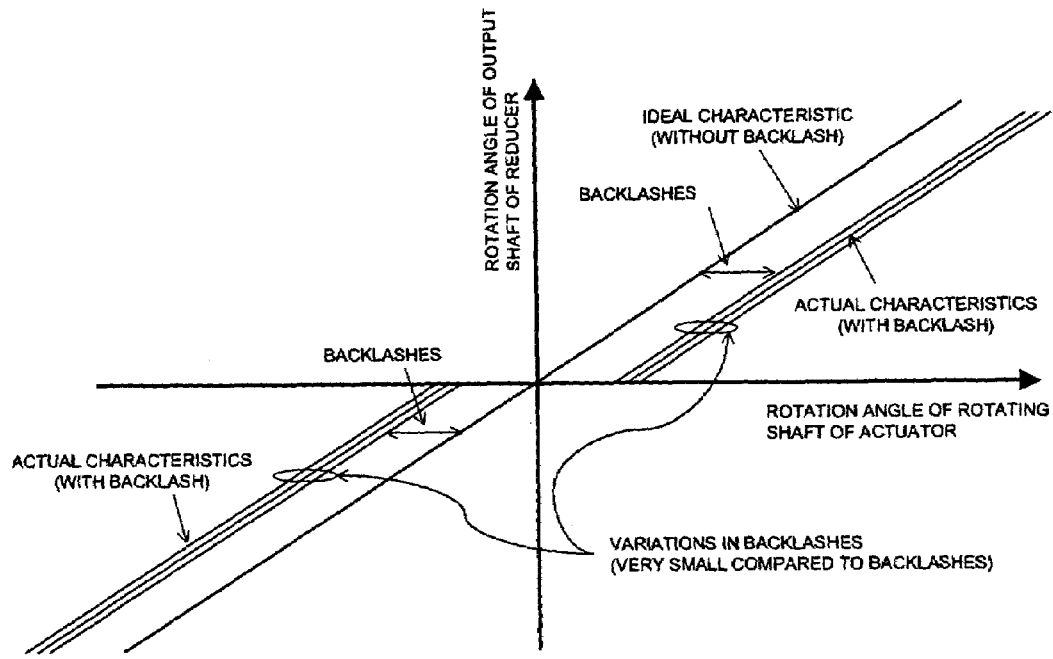
FIG. 6 is a schematic graph illustrating the relationships between backlashes and characteristics of a commercially produced robot.

FIG. 6 illustrates the relationships between backlashes and characteristics of a commercially produced robot. By adjusting an open-loop gain of a position servo-compensator of each joint axis actuator as desired so as to control the variations in position errors, the second method for optimizing the legged walking robot 100 has a similar advantage to that of the foregoing first optimization method.

Figure 7:
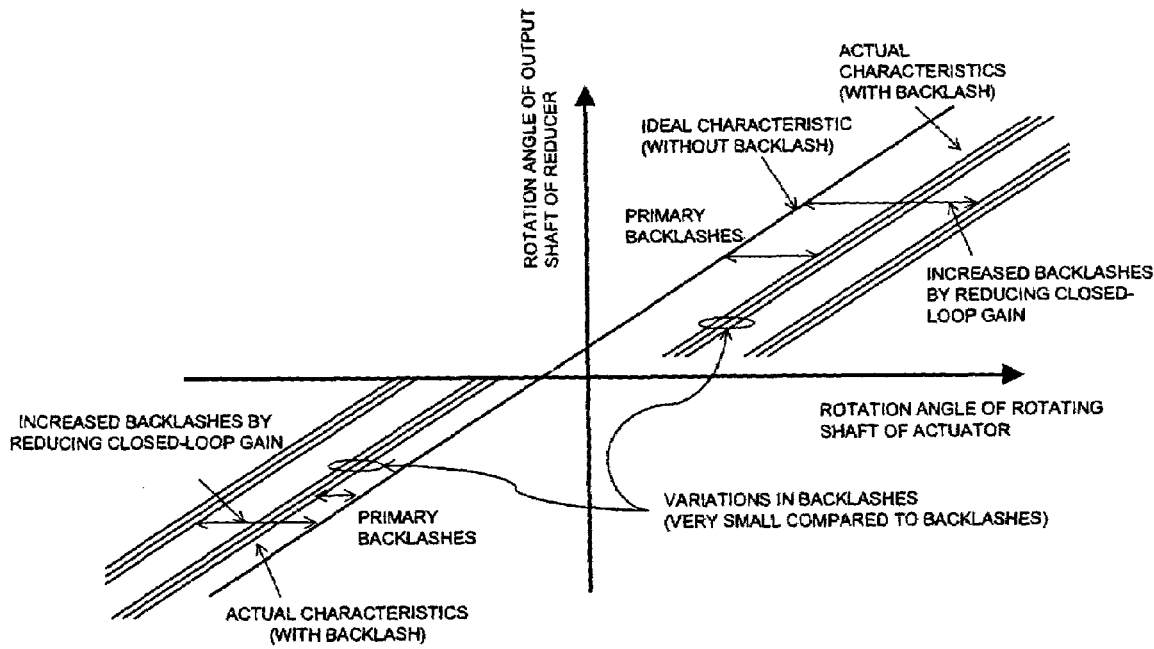
FIG. 7 is a schematic graph illustrating the relationships between backlashes and characteristics adjusted by position servo-compensation.

FIG. 7 illustrates the relationships between backlashes and characteristics adjusted by linear position servo-compensation. Also, FIG. 8 illustrates the concrete configuration of a position servo-compensator for controlling the characteristics shown in FIG. 7.

Figure 8:
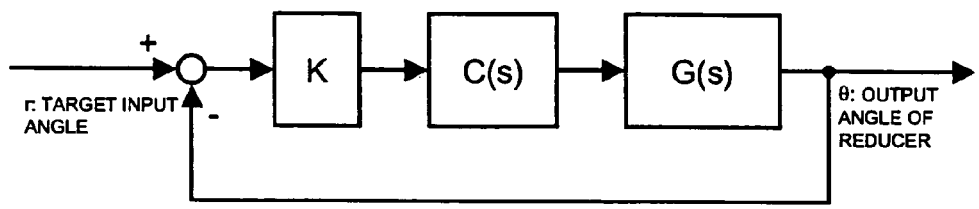
FIG. 8 illustrates the concrete configuration of a position servo-compensator for controlling the characteristics as shown in FIG. 7.

By adjusting the proportional gain (series compensation gain) K in the position servo-system as shown in FIG. 8, the second method for optimizing the legged walking robot 100 is realized.

It is assumed that the average backlash of the commercially produced reducers is 0.3 deg., for example, and that, when the proportional gain K is equal to 2.0, the characteristic (in which the positioning accuracy is equal to the backlash) of the reducer appears.

Also, it is assumed that the frequency response characteristic of the open-loop gain has a suppression ratio of +30 dB at f$\leq$1 Hz, by decreasing the proportional gain K down to 1.8, the open-loop gain decreases to +29 dB which is down by the amount of about 1 dB.

When the target angle of 9 deg. at a speed corresponding to the frequency of 1 Hz is input, this difference in the gains causes a position variation of 0.285 deg., since the suppression ratio is +30 dB at the proportional gain K of 2.0. It should be noted that, since the backlash is 0.3 deg., the variation does not in reality lie within this value of the backlash.

Meanwhile, when the proportional gain K is decreased to 1.8, since the suppression ratio becomes −29 dB, the position deviation becomes 0.32 deg. This is equivalent to a physical increase of the backlash by the amount of 0.02 deg.

Figure 9:
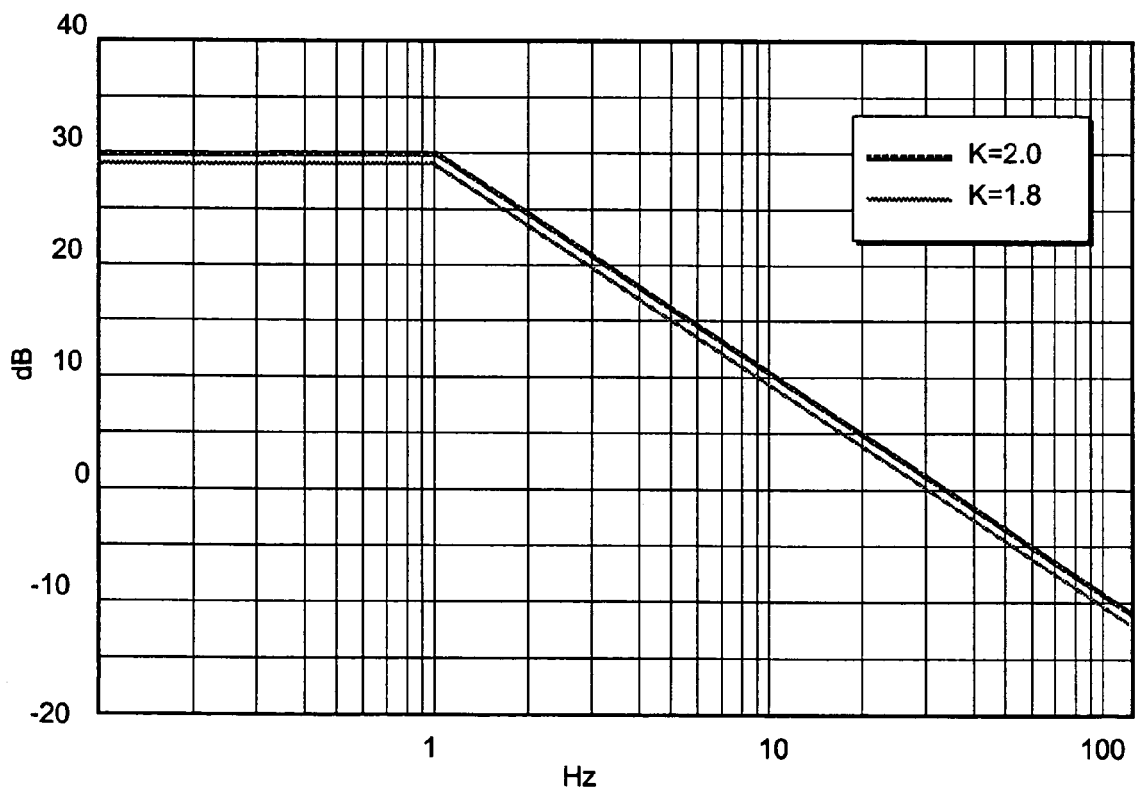
FIG. 9 is a graph illustrating the relationships between proportional gains and suppression ratios.

FIG. 9 illustrates the relationships between the proportional gains and the suppression ratios.

By applying the above-mentioned operation to each joint axis of the leg, the leg obtains the optimized characteristic. Since this operation can be applied to an actuator of any of the joint axes, it can be said that this is a very effective method for designing the characteristic of the leg made of commercially produced components.

Figure 10:
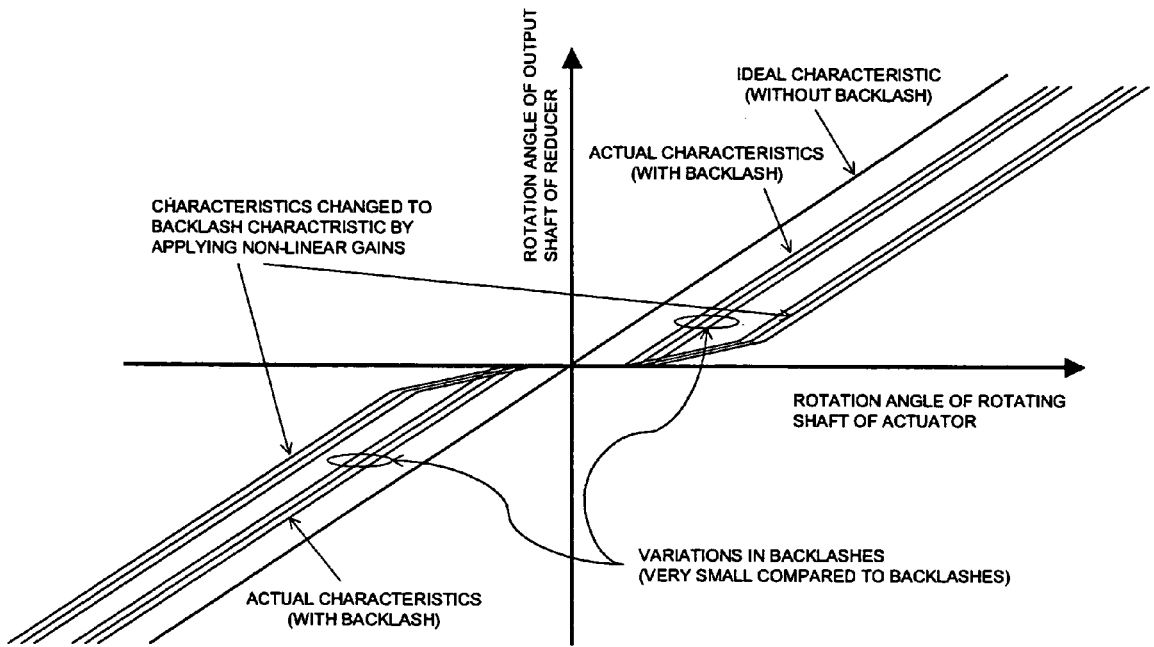
FIG. 10 is a schematic graph illustrating the relationships between backlashes and characteristics adjusted by non-linear position servo-compensation while minimizing a dead band.
Figure 11:
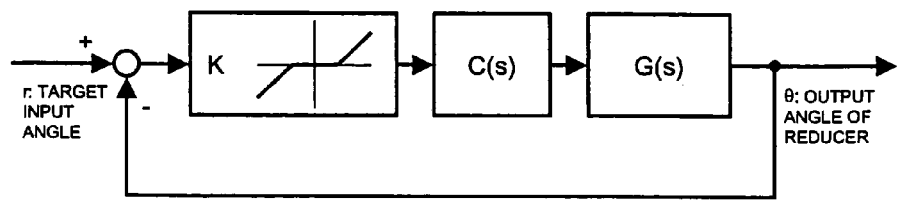
FIG. 11 illustrates the concrete configuration of a non-linear position servo-compensator for controlling the characteristics as shown in FIG. 10.

FIG. 10 illustrates the relationships between backlashes and characteristics adjusted by non-linear position servo-compensation. In an example shown in FIG. 10, the backlashes are adjusted while minimizing a dead band. Also, FIG. 11 illustrates the concrete configuration of another position servo-compensator for controlling the characteristics as shown in FIG. 10.

Figure 12:
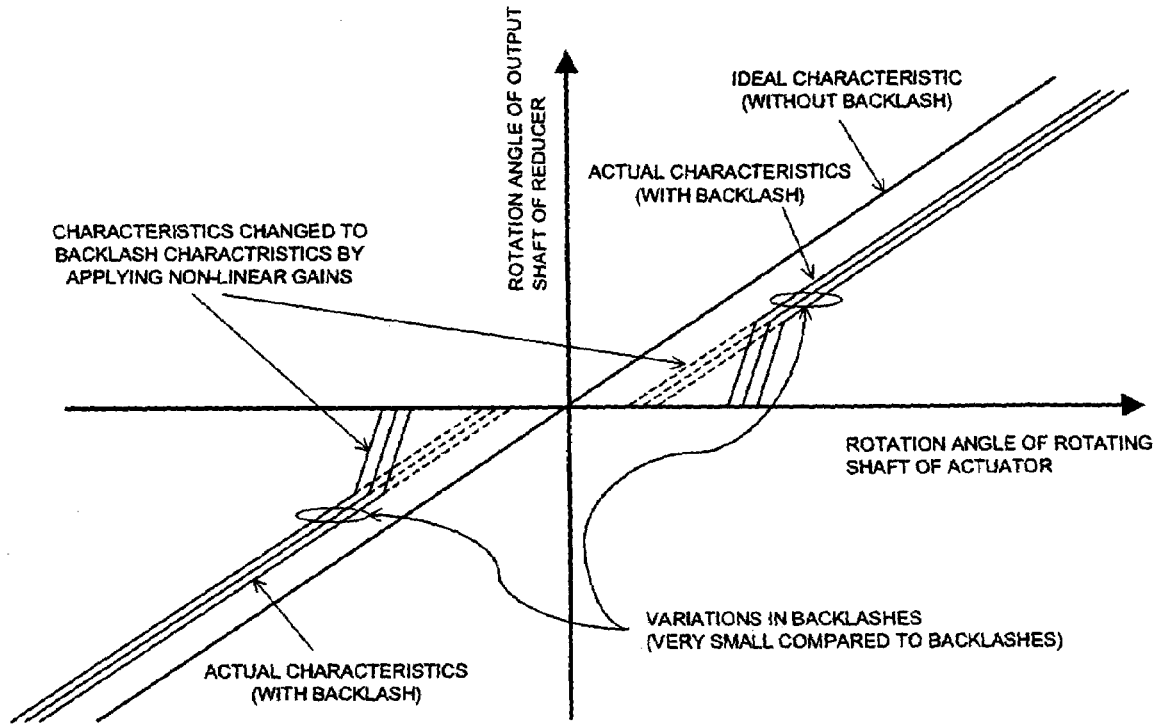
FIG. 12 is a schematic graph illustrating the relationships between backlashes and characteristics adjusted by non-linear position servo-compensation so that, by intentionally widening the dead band, an actual characteristic is provided when the rotating shaft of an actuator rotates beyond a certain angle range.
Figure 13:
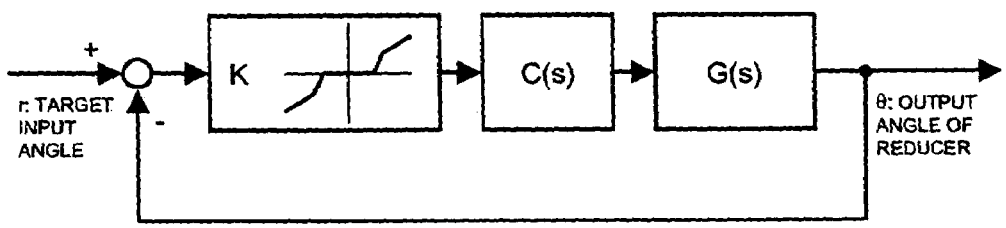
FIG. 13 illustrates the concrete configuration of a non-linear position servo-compensator for controlling the characteristics as shown in FIG. 12.

FIG. 12 illustrates the relationships between backlashes and characteristics adjusted by non-linear position servo-compensation. In an example shown in FIG. 12, by intentionally widening the dead band, the backlash is adjusted so as to provide an actual characteristic when the rotating shaft of an actuator rotates beyond a certain angle range. Also, FIG. 13 illustrates the concrete configuration of another position servo-compensator for controlling the characteristics as shown in FIG. 12.

The legged walking robot 100 has joint degrees-of-freedom of each joint of the trunk, the hip joints, the ankles, and so forth by combining the roll and pitch axes. The inventors et al. recommend that the body be designed such that a backlash $\Delta P$ about the pitch axis is greater than a backlash $\Delta R$ about the roll axis (i.e., $\Delta P > \Delta R$) for their common joint. When walking straight ahead is considered, the biped, legged walking robot has rolling and yawing motions which are dominant because of having no yawing motion involved, and thus the robot has a wider stable region in the X-direction than in the Y-direction, thereby leading to the conclusion: $\Delta P > \Delta R$.

When the yaw axis is disposed at the base of the leg as the joint degrees-of-freedom structure of the body as shown in FIG. 3, even when a yawing motion occurs, for example, at the time of turning, the motion does not interfere with the pitching or rolling motion of the flat foot in a leg coordinate system (in which the hip joint axis is an origin). That is, the attitude deviation of the flat foot caused by a backlash $\Delta Y$ of the yaw axis affects only on a yaw-axis angle and can be ignored when a virtually stable region is large enough compared to the deviation.

On the other hand, when the yaw axis is disposed at the upper thigh or the lower thigh, the backlash $\Delta Y$ of the yaw axis interferes with the pitching or rolling motion of the flat foot in the leg coordinate system (in which the hip joint axis is an origin). In this case, it is increasingly important to control the backlash $\Delta Y$ of the yaw axis.

With the above-described technical background, the distribution of the backlashes of the corresponding joints of the legged walking robot is generalized as follows.

(1) Expression from the Viewpoint of the ZMP Control:

$f(P_1, P_2, \ldots P_i, R_1, R_2, \ldots Y_j, Y_1, Y_2, \ldots Y_k,$
$\dot{P}_1, \dot{P}_2, \ldots \dot{P}_i, \dot{R}_1, \dot{R}_2, \ldots \dot{Y}_j, \dot{Y}_1, \dot{Y}_2, \ldots \dot{Y}_k,$
$\ddot{P}_1, \ddot{P}_2, \ldots \ddot{P}_i, \ddot{R}_1, \ddot{R}_2, \ldots \ddot{Y}_j, \ddot{Y}_1, \ddot{Y}_2, \ldots \ddot{Y}_k,$
$\Delta P_1, \Delta P_2, \ldots \Delta P_i, \Delta R_1, \Delta R_2, \ldots \Delta R, \ldots \Delta Y_1, \Delta Y_2, \ldots \Delta Y_k,$
$\Delta \dot{P}_1, \Delta \dot{P}_2, \ldots \Delta \dot{P}_i, \Delta \dot{R}_1, \Delta \dot{R}_2, \ldots \Delta \dot{R}_j \ldots \Delta \dot{Y}_1, \Delta \dot{Y}_2, \ldots$
$\Delta \dot{Y}_k,$ $\Delta \ddot{P}_1, \Delta \ddot{P}_2, \ldots \Delta \ddot{P}_i, \Delta \ddot{R}_1, \Delta \ddot{R}_2, \ldots \Delta \ddot{R}_j \ldots \Delta \ddot{Y}_j, \Delta \ddot{Y}_1, \Delta \ddot{Y}_2, \ldots \Delta \ddot{Y}_k, ,t) = \text{presetZNP}(ZMP_x, ZMP_y, ZMP_z) + \Delta ZMP(\Delta ZMP_x, \Delta ZMP_y, \Delta ZMP_z) \leq S(S_x, S_y, S_z)$ t: time presetZMP($ZMP_x, ZMP_y, ZMP_z$): ZMP target position(X-direction target position, Y-direction target position, Z-direction target position) $\Delta ZMP(\Delta ZMP_x, \Delta ZMP_y, \Delta ZMP_z)$: ZMP difference (X-direction difference, Y-direction difference, Z-direction difference) $S(S_x, S_y, S_z)$: virtually stable region(X-direction region, Y-direction region, Z-direction region)

$f(P_1, P_2, \ldots P_i, R_1, R_2, \ldots Y_j, Y_1, Y_2, \ldots Y_k,$
$\dot{P}_1, \dot{P}_2, \ldots \dot{P}_i, \dot{R}_1, \dot{R}_2, \ldots \dot{Y}_j, \dot{Y}_1, \dot{Y}_2, \ldots \dot{Y}_k,$
$\ddot{P}_1, \ddot{P}_2, \ldots \ddot{P}_i, \ddot{R}_1, \ddot{R}_2, \ldots \ddot{Y}_j, \ddot{Y}_1, \ddot{Y}_2, \ldots \ddot{Y}_k,$
$\Delta P_1, \Delta P_2, \ldots \Delta P_i, \Delta R_1, \Delta R_2, \ldots \Delta R_j, \ldots \Delta Y_1, \Delta Y_2, \ldots \Delta Y_k,$
$\Delta \dot{P}_1, \Delta \dot{P}_2, \ldots \Delta \dot{P}_i, \Delta \dot{R}_1, \Delta \dot{R}_2, \ldots \Delta \dot{R}_j \ldots \Delta \dot{Y}_1, \Delta \dot{Y}_2, \ldots \Delta \dot{Y}_k,$
$\Delta \ddot{P}_1, \Delta \ddot{P}_2, \ldots \Delta \ddot{P}_i, \Delta \ddot{R}_1, \Delta \ddot{R}_2, \ldots \Delta \ddot{R}_j \ldots \Delta \ddot{Y}_1, \Delta \ddot{Y}_2, \ldots \Delta \ddot{Y}_k, t)$: function for computing the actual ZMP position based on target values and differences of corresponding degrees of freedom $P_i$: angular target value in degree-of-freedom about i-th pitch axis $\dot{P}_i$: angular-speed target value in degree-of-freedom about i-th pitch axis $\ddot{P}_i$: angular-acceleration target value in degree-of-freedom about i-th pitch axis $\Delta P_i$: deviation from angular target value due to backlash in degree-of-freedom about i-th pitch axis $\Delta \dot{P}_i$: deviation from angular-speed target value due to backlash in degree-of-freedom about i-th pitch axis $\Delta \ddot{P}_i$: deviation from angular-acceleration target value due to backlash in degree-of-freedom about i-th pitch axis $R_i$: angular target value in degree-of-freedom about i-th roll axis $\dot{R}_i$: angular-speed target value in degree-of-freedom about i-th roll axis $\ddot{R}_i$: angular-acceleration target value in degree-of-freedom about i-th roll axis $\Delta R_i$: deviation from angular target value due to backlash in degree-of-freedom about i-th roll axis $\Delta \dot{R}_i$: deviation from angular-speed target value due to backlash in degree-of-freedom about i-th roll axis $\Delta \ddot{R}_i$: deviation from angular-acceleration target value due to backlash in degree-of-freedom about i-th roll axis $Y_i$: angular target value in degree-of-freedom about i-th yaw axis $\dot{Y}_i$: angular-speed target value in degree-of-freedom about i-th yaw axis $\ddot{Y}_i$: angular-acceleration target value in degree-of-freedom about i-th yaw axis $\Delta Y_i$: deviation from angular target value due to backlash in degree-of-freedom about i-th yaw axis $\Delta \dot{Y}_i$: deviation from angular-speed target value due to backlash in degree-of-freedom about i-th yaw axis $\Delta \ddot{Y}_i$: deviation from angular-acceleration target value due to backlash in degree-of-freedom about i-th yaw axis (2) Expression from the Viewpoint of the Dynamic Closing Error:

maximum value of $|g(P_1, P_2, K P_i, R_1, R_2, K Y_j, Y_1, Y_2, K Y_k,)| = \Delta C (\Delta C_x, \Delta C_y, \Delta C_z, \Delta C_p, \Delta C_r, \Delta C_y)$ $g(P_1, P_2, K P_1, R_1, R_2, K Y_j, Y_1, Y_2, K Y_k,)$: function for computing dynamic closing errors based on the corresponding targets values $\Delta C(\Delta C_x, \Delta C_y, \Delta C_z, \Delta C_p, \Delta C_r, \Delta C_y)$: maximum value of the dynamic closing errors $\Delta C_x$: dynamic closing error in X-direction $\Delta C_y$: dynamic closing error in Y-direction $\Delta C_z$: dynamic closing error in Z-direction $\Delta C_p$: dynamic closing error about pitch-axis $\Delta C_r$: dynamic closing error about roll-axis $\Delta C_y$: dynamic closing error about yaw-axis find minimum values of $\Delta P_i$, $\Delta R_j$, $\Delta Y_k$ for satisfying the equasion;

$$\Delta C(\Delta C_x, \Delta C_y, \Delta C_z, \Delta C_p, \Delta C_r, \Delta C_y) = 0$$

Thus, the range of the backlash of each joint is determined from the above expressions (1) and (2).

Appendix

While the present invention has been described in detail referring to the specific embodiment, it is evident that one skilled in the art will make modifications and alternatives of the foregoing embodiment without departing from the scope of the sprit of the present invention.

Also, the spirit of the present invention is not always limited to a product called a ROBOT. That is, the present invention is applicable to products in other industrial fields such as a toy as long as they are mechanical apparatuses that perform motions imitating human motions by utilizing an electric or magnetic effect.

After all, the description of this specification should not be interpreted in a limited manner since it is disclosed in an exemplary form. The claims stated at the beginning should be viewed in order to understand the spirit of the present invention.

INDUSTRIAL APPLICABILITY

According to the present invention, an excellent legged walking robot, which stably and accurately performs a leg-moving operation by switching its standing modes, for example, by standing alternately with a single or both of right and left movable legs, and an excellent motion control method therefor can be provided.

Also, according to the present invention, an excellent legged walking robot, which performs an attitude stabilization control in accordance with a detachment or a crash caused by the difference between an expected value and an actual value when the legged walking robot changes its link mechanism with a floor, a wall, or the like from an open link mechanism to a closed link mechanism, for example, when it switches its standing mode from a single-leg standing mode to a both-legs standing mode, and an excellent motion control method therefor can be provided.

In addition, according to the present invention, an excellent legged walking robot, which performs a high-speed switching operation between an open link mode and a closed link mode with the outside world or a working object without losing the attitude stability of its body, and an excellent motion control method therefor can be provided.

The invention claimed is:

1. A legged walking robot comprising:
   at least two movable legs,
   wherein each movable leg has a plurality of joint degrees-of-freedom and passive degrees-of-freedom,
   wherein a movement of each of the plurality of degrees-of-freedom is a function of a priority order of joints and a backlash of each of the actuators that control movement in each of the legs, and
   wherein the passive degrees-of-freedom are a function of removing a dynamic closing error and a movable range of each of the legs.

2. The legged walking robot according to claim 1, wherein the movable legs are right and left movable legs and the right and left movable legs have substantially the same degrees-of-freedom with each other.

3. The legged walking robot according to claim 1, wherein each joint degree-of-freedom is achieved by an actuator, connected to a reducer; and
wherein the passive degree-of-freedom of each joint is a function of a backlash of the reducer connected to the actuator.

4. The legged walking robot according to claim 3, wherein a joint of one limb lying closer to a far end of the limb has a larger backlash than that of another joint of the limb.

5. The legged walking robot according to claim 3, wherein a joint of one limb lying closer to a far end of the limb has a larger backlash in a degree of freedom about a roll axis than that of another joint of the limb.

6. The legged walking robot according to claim 3, wherein a joint of one limb lying closer to a far end of the limb has a larger backlash in a degree of freedom about a pitch axis than that of another joint of the limb.

7. The legged walking robot according to claim 3, wherein a joint lying closest to a far end of one limb has a larger backlash than that of another joint lying closest to abase of the limb.

8. The legged walking robot according to claim 3, wherein a joint lying closest to a far end of one limb has a larger backlash in a degree of freedom about a roll axis than that of another joint lying closest to a base of the limb.

9. The legged walking robot according to claim 3, wherein a joint lying closest to a far end of one limb has a larger backlash in a degree of freedom about a pitch axis than that of another joint lying closest to a base of the limb.

10. The legged walking robot according to claim 1, wherein the movable leg has at least joint degrees-of freedom about corresponding hip-joint roll-axis, ankle-joint roll-axis, hip-joint pitch-axis, knee-joint pitch-axis, ankle-joint pitch-axis, and hip-joint yaw-axis, and
wherein backlashes about the corresponding hip-joint roll-axis, ankle-joint roll-axis, hip-joint pitch-axis, knee-joint pitch-axis, and ankle-joint pitch-axis become smaller in that order.

11. The legged walking robot according to claim 1, wherein the movable leg has at least joint degrees-of-freedom about the corresponding hip-joint roll-axis, ankle-joint roll-axis, hip-joint pitch-axis, knee-joint pitch-axis, ankle-joint pitch-axis, and hip-joint yaw-axis and
wherein a backlash about the hip-joint roll-axis is smaller than that about the ankle-joint roll-axis.

12. The legged walking robot according to claim 1, wherein the movable leg has at least joint degrees-of-freedom about the corresponding hip-joint roll-axis, ankle-joint roll-axis, hip-joint pitch-axis, knee-joint pitch-axis, ankle-joint pitch-axis, and hip-joint yaw-axis, and
wherein backlashes about the corresponding hip-joint pitch-axis, knee-joint pitch-axis, and ankle-joint pitch-axis become smaller in that order.

13. The legged walking robot according to claim 1, wherein the movable leg has at least joint degrees-of freedom about the corresponding hip-joint roll-axis, ankle-joint roll-axis, hip-joint pitch-axis, knee-joint pitch-axis, ankle-joint pitch-axis, and hip-joint yaw-axis, and
wherein a backlash about the hip-joint pitch-axis is smaller than that about the ankle-joint pitch-axis.

14. The legged walking robot according to claim 1, wherein the movable leg has at least joint degrees-of freedom about the corresponding hip-joint roll-axis, ankle-joint roll-axis, hip-joint pitch-axis, knee-joint pitch-axis, ankle-joint pitch-axis, and hip-joint yaw-axis, and
wherein a backlash about the hip-joint pitch-axis is smaller than that about the knee-joint pitch-axis.

15. The legged walking robot according to claim 1, wherein the movable leg has at least joint degrees-of freedom about the corresponding hip-joint roll-axis, ankle-joint roll-axis, hip-joint pitch-axis, knee-joint pitch-axis, ankle-joint pitch-axis, and hip-joint yaw-axis, and
wherein a backlash about the knee-joint pitch-axis is smaller than that about the ankle-joint pitch-axis.

16. The legged walking robot according to claim 1, wherein differences due to reduction in a dynamic closing error generated at a time of a grounding of an idle leg, are controlled in a following order: a foot; a lower thigh; and an upper thigh.

17. The legged walking robot according to claim 1, wherein a sum of backlashes of at least one leg in each degree-of-freedom is controlled.

18. The legged walking robot according to claim 1, wherein at least one leg has a sum of backlashes about a roll axis in the range from 0.05 to 2.0 degrees.

19. The legged walking robot according to claim 1, wherein at least one leg has a sum of backlashes about a pitch axis in a range from 0.10 to 4.0 degrees.

20. A legged walking robot comprising:
at least two movable legs,
wherein each movable leg has a plurality of joint degrees-of-freedom and passive degrees-of-freedom,
wherein output of each of a plurality of actuators controlling each of the plurality of joint degrees-of-freedom is a function of an order of priority and a backlash of each of the actuators, and
wherein the passive degrees-of-freedom are a function of a dynamic closing error and a movable range of each of the legs.

* * * * *

UNITED STATES PATENT AND TRADEMARK OFFICE
CERTIFICATE OF CORRECTION

PATENT NO. : 7,278,501 B2
APPLICATION NO. : 10/398070
DATED : October 9, 2007
INVENTOR(S) : Naoto Mori et al.

It is certified that error appears in the above-identified patent and that said Letters Patent is hereby corrected as shown below:

On the Title Page:

Item (75) Inventors should read:

--Naoto Mori, Masatsugu Iribe;

Jinichi Yamaguchi, all of Tokyo (JP)--.

Signed and Sealed this

Thirty-first Day of August, 2010

David J. Kappos
*Director of the United States Patent and Trademark Office*